US012141556B2

(12) United States Patent
Cai et al.

(10) Patent No.: US 12,141,556 B2
(45) Date of Patent: Nov. 12, 2024

(54) TRANSPARENT AND CONTROLLABLE HUMAN-AI INTERACTION VIA CHAINING OF MACHINE-LEARNED LANGUAGE MODELS

(71) Applicant: Google LLC, Mountain View, CA (US)

(72) Inventors: Carrie Cai, Mountain View, CA (US); Tongshuang Wu, Seattle, WA (US); Michael Andrew Terry, Cambridge, MA (US)

(73) Assignee: Google LLC, Mountain View, CA (US)

( * ) Notice: Subject to any disclaimer, the term of this patent is extended or adjusted under 35 U.S.C. 154(b) by 17 days.

(21) Appl. No.: 17/957,526

(22) Filed: Sep. 30, 2022

(65) Prior Publication Data
US 2023/0112921 A1 Apr. 13, 2023

Related U.S. Application Data

(60) Provisional application No. 63/251,264, filed on Oct. 1, 2021, provisional application No. 63/315,648, filed on Mar. 2, 2022.

(51) Int. Cl.
G06F 8/35 (2018.01)
G06F 8/30 (2018.01)
G06F 8/34 (2018.01)

(52) U.S. Cl.
CPC .............. *G06F 8/35* (2013.01); *G06F 8/31* (2013.01); *G06F 8/34* (2013.01)

(58) Field of Classification Search
CPC ................. G06F 8/31; G06F 8/34; G06F 8/35
See application file for complete search history.

(56) References Cited

U.S. PATENT DOCUMENTS

| 9,135,237 | B2 * | 9/2015 | Deshmukh | G06F 40/247 |
| 2019/0197109 | A1 * | 6/2019 | Peters | G06F 40/30 |
| 2021/0035556 | A1 * | 2/2021 | Shen | G06F 18/24765 |
| 2022/0245362 | A1 * | 8/2022 | Nizar | G06F 40/30 |

FOREIGN PATENT DOCUMENTS

CN 114420159 A * 4/2022

OTHER PUBLICATIONS

NPL_CN_114420159_A_English Translation, Author: Xiao-fei Yang, Publication Date Apr. 9, 2022, pp. 1-20 (Year: 2022).*

(Continued)

*Primary Examiner* — Ziaul A Chowdhury
(74) *Attorney, Agent, or Firm* — Dority & Manning P.A.

(57) ABSTRACT

The present disclosure provides to transparent and controllable human-AI interaction via chaining of machine-learned language models. In particular, although existing language models (e.g., so-called "large language models" (LLMs)) have demonstrated impressive potential on simple tasks, their breadth of scope, lack of transparency, and insufficient controllability can make them less effective when assisting humans on more complex tasks. In response, the present disclosure introduces the concept of chaining instantiations of machine-learned language models (e.g., LLMs) together, where the output of one instantiation becomes the input for the next, and so on, thus aggregating the gains per step.

20 Claims, 17 Drawing Sheets

(56) References Cited

OTHER PUBLICATIONS

"GPT-3 is an Idea Machine", Sep. 4, 2020, https://interconnected.org/home/2020/09/04/idea_machine, retrieved Oct. 13, 2022, 6 pages.
"Prompt Design 101", https://beta.openai.com/docs/introduction/prompt-design-101, retrieved Oct. 13, 2022, 8 pages.
Reif et al., "A Recipe for Arbitrary Text Style Transfer with Large Language Models", arXiv:2109.03910v4, Mar. 31, 2022, 12 pages.
Adhikary et al., "Accelerating Text Communication via Abbreviated Sentence Input", International Joint Conference on Natural Language Processing, Aug. 1-6, 2021, pp. 6574-6588.
Amershi et al., "Guidelines for Human-AI Interaction", Conference on Human Factors in Computing Systems, Glasgow, Scotland, United Kingdom, May 4-9, 2019, 19 pages.
Bansal et al., "Does the Whole Exceed its Parts? The Effect of AI Explanations on Complementary Team Performance", arXiv:2006.14779v3, Jan. 12, 2021, 16 pages.
Bender et al., "Climbing Towards NLU: On Meaning, Form, and Understanding in the Age of Data", Association for Computational Linguistics Seattle, Washington, United States, Jul. 5-10, 2020, pp. 5185-5198.
Bernstein et al., "Soylent: A Word Processor with a Crowd Inside", Symposium on User Interface Software and Technology, 2010, pp. 313-322.
Betz et al., "Thinking Aloud: Dynamic Context Generation Improves Zero-Shot Reasoning Performance of GPT-2", arXiv:2103.13033v1, Mar. 24, 2021, 17 pages.
Bommasani et al., "On the Opportunities and Risks of Foundation Models", arXiv:2108.07258v3, Jul. 12, 2022, 214 pages.
Branwen, "GPT-3 Creative Fiction", Jun. 19, 2020, https://www.gwern.net/GPT-3, retrieved on Oct. 13, 2022, 149 pages.
Brown et al., "Language Models are Few-Shot Learners", arXiv:2005.14165v4, Jul. 22, 2020, 75 pages.
Buschek et al., "Nine Potential Pitfalls When Designing Human-AI Co-Creative Systems", arXiv:2104.00358v1, Apr. 1, 2021, 8 pages.
Cai et al., "Chain Reactions: The Impact of Order on Microtask Chains", Conference on Human Factors in Computing Systems, San Jose, California, United States, May 7-12, 2016, pp. 3143-3154.
Cai et al., "Human-Centered Tools for Coping with Imperfect Algorithms During Medical Decision-Making", Conference on Human Factors in Computing Systems, May 4-9, 2019, Glasgow, Scotland, United Kingdom, 14 pages.
Cambre et al., "Juxtapeer: Comparative Peer Review Yields Higher Quality Feedback and Promotes Deeper Reflection", Conference on Human Factors in Computing Systems, Montreal, Canada, Apr. 21-26, 2018, 13 pages.
Carroll et al., "Mental Models in Human-Computer Interaction. Handbook of Human-Computer Interaction", 1987, 54 pages.
Chen et al., "VizLinter: A Linter and Fixer Framework for Data Visualization", arXiv:2108.10299v1, Aug. 23, 2021, 11 pages.
Cheng et al., "Break It Down: A Comparison of Macro- and Microtasks", Conference on Human Factors in Computing Systems, Seoul, Republic of Korea, Apr. 18-23, 2015, 4 pages.
Chilton et al., "Cascade: Crowdsourcing Taxonomy Creation", SIGCHI Conference on Human Factors in Computing Systems, Paris, France, Apr. 27-May 2, 2013, pp. 1999-2008.
Chilton et al., "HumorTools: A Microtask Workflow for Writing News Satire", Woodstock 97, El Paso, Texas, United States, 2015, 12 pages.
Clark et al., "Creative Writing with a Machine in the Loop: Case Studies on Slogans and Stories", International Conference on Intelligent User Interfaces, Tokyo, Japan, Mar. 7-11, 2018, pp. 329-340.
Davis et al., "Empirically Studying Participatory Sense-Making in Abstract Drawing with a Co-Creative Cognitive Agent", International Conference on Intelligent User Interfaces, Sonoma, California, United States, Mar. 7-10, 2016, 12 pages.
Edge et al., "MicroMandarin: Mobile Language Learning in Context", Conference on Human Factors in Computing Systems, May 7-12, 2011, Vancouver, British Columbia, Canada, 10 pages.
Floridi et al., "GPT-3: Its Nature, Scope, Limits, and Consequences", Minds and Machines, vol. 30, No. 4, 2020, pp. 681-694.
Gero et al., "Metaphoria: An Algorithmic Companion for Metaphor Creation" Conference on Human Factors in Computing Systems, Glasgow, Scotland, United Kingdom, May 4-9, 2019, 12 pages.
Green et al., "Predictive Translation Memory: A Mixed-Initiative System for Human Language Translation", User Interface Software and Technology, Oct. 5-8, 2014, Honolulu, Hawaii, United States, 11 pages.
Hendrycks et al., "Measuring Massive Multitask Language Understanding" arXiv:2009.03300v3, Jan. 12, 2021, 27 pages.
Holtzman et al., "The Curious Case of Neural Text Degeneration", arXiv:1904.09751v2, Feb. 14, 2020, 16 pages.
Huang et al., "AI Song Contest: Human-AI Co-Creation in Songwriting", arXiv:2010.05388v1, Oct. 12, 2020, 9 pages.
Jiang et al., "Genline and Genform: Two Tools for Interacting with Generative Language Models in a Code Editor", User Interface Software and Technology '21 Adjunct, Oct. 10-14, 2021, Virtual Event, 3 pages.
Jozefowicz et al., "Exploring the Limits of Language Modeling", arXiv:1602.02410v2, Feb. 11, 2016, 11 pages.
Kim et al., "Mechanical Novel: Crowdsourcing Complex Work through Reflection and Revision", Computer Supported Cooperative Work and Social Computing, Feb. 25-Mar. 1, 2017, Portland, Oregon, United States, 13 pages.
Kittur et al., "Crowd-Forge: Crowdsourcing Complex Work", User Interface Software and Technology, Oct. 16-19, 2011, Santa Barbara, California, United States, 10 pages.
Koch et al., "May AI?: Design Ideation with Cooperative Contextual Bandits", Conference on Human Factors in Computing Systems, Glasgow, Scotland, United Kingdom, May 4-9, 2019, 12 pages.
Kulkarni et al., "Turkomatic: Automatic, Recursive Task and Workflow Design for Mechanical Turk", Extended Abstracts on Human Factors in Computing Systems, May 2011, Vancouver, British Columbia, Canada, pp. 2053-2058.
Law et al., "Towards Large-Scale Collaborative Planning: Answering High-Level Search Queries Using Human Computation", AAAI Conference on Artificial Intelligence, vol. 25, No. 1, San Francisco, California, United States, Aug. 7-11, 2011, pp. 1210-1215.
Levy et al., "Assessing the Impact of Automated Suggestions on Decision Making: Domain Experts Mediate Model Errors but Take Less Initiative" arXiv:2103.04725v2, Mar. 29, 2021, 14 pages.
Lieber et al., "Jurassic-1: Technical Details and Evaluation", Technical Report, AI21 Labs, 2021, 9 pages.
Likert, "A Technique for the Measurement of Attitudes", Archives of Psychology, vol. 22, 1932, 53 pages.
Liu et al., "What Makes Good In-Context Examples for GPT-3?", arXiv:2101.06804v1, Jan. 17, 2021, 12 pages.
Louie et al., "Novice-AI Music Co-Creation via AI-Steering Tools for Deep Generative Models", Conference on Human Factors in Computing Systems, Honolulu, Hawaii, United States, Apr. 25-30, 2020, 13 pages.
Lu et al., "Fantastically Ordered Prompts and Where to Find Them: Overcoming Few-Shot Prompt Order Sensitivity", arXiv:2104.08786v2, Mar. 3, 2022, 13 pages.
Majaranta et al., "Text Entry by Gaze: Utilizing Eye-Tracking. Text Entry Systems: Mobility, Accessibility, Universality", Elsevier Science & Technology, ProQuest eBook Central, 2007, pp. 175-187.
Mishra et al., "Cross-Task Generalization via Natural Language Crowdsourcing Instructions", arXiv:2104.08773v4, Mar. 14, 2022, 18 pages.
Moritz et al., "Formalizing Visualization Design Knowledge as Constraints: Actionable and Extensible Models in Draco", Transactions on Visualization and Computer Graphics, vol. 25, Issue 1, Jan. 2019, 11 pages.
Narayan et al., "Similar Image Search for Histopathology: SMILY", arXiv:1901.11112v3, Feb. 6, 2019, 29 pages.
Nushi et al., "On Human Intellect and Machine Failures: Troubleshooting Integrative Machine Learning Systems", arXiv:1611.08309v1, Nov. 24, 2016, 11 pages.
O'Connor et al., "What Context Features Can Transformer Language Models Use?", arXiv:2106.08367v1, Jun. 15, 2021, 14 pages.

(56) References Cited

OTHER PUBLICATIONS

Oh et al., "I Lead, You Help but Only with Enough Details: Understanding User Experience of Co-Creation with Artificial Intelligence", Conference on Human Factors in Computing Systems, Montreal, Quebec, Canada, Apr. 21-26, 2018, 13 pages.
Ranzato et al., "Sequence Level Training with Recurrent Neural Networks", arXiv:1511.06732v7, May 6, 2016, 16 pages.
Retelny et al., "No Workflow Can Ever Be Enough: How Crowdsourcing Workflows Constrain Complex Work", Proceedings of the ACM on Human-Computer Interaction, vol. 1, Nov. 2017, 23 pages.
Reynolds et al., "Prompt Programming for Large Language Models: Beyond the Few-Shot Paradigm", arXiv:2102.07350v1, Feb. 15, 2021, 10 pages.
Rough et al., "An Evaluation of Dasher with a High-Performance Language Model as a Gaze Communication Method", Conference on Advanced Visual Interfaces, May 27-30, 2014, Como, Italy, pp. 169-176.
Satyanarayan et al., "Vega-lite: A Grammar of Interactive Graphics", Transactions on Visualization and Computer Graphics, vol. 23, Jan. 2017, 10 pages.
Shin et al., "AutoPrompt: Eliciting Knowledge from Language Models with Automatically Generated Prompts", arXiv:2010.15980v2, Nov. 7, 2020, 15 pages.
Smith-Renner et al., "No Explainability without Accountability: An Empirical Study of Explanations and Feedback in Interactive ML"., Conference on Human Factors in Computing Systems, Honolulu, Hawaii, United States, Apr. 25-30, 2020, 14 pages.
Swanson et al., "Story Centaur: Large Language Model Few Shot Learning as a Creative Writing Tool", Association for Computational Linguistics, Online, Apr. 19-23, 2021, pp. 244-256.
Tan et al., "Progressive Generation of Long Text with Pretrained Language Models", arXiv:2006.15720v2, Apr. 14, 2021, 12 pages.
Teevan et al., "Productivity Decomposed: Getting Big Things Done with Little Microtasks", Conference Extended Abstracts on Human Factors in Computing Systems, San Jose, California, United States, May 7-12, 2016, 8 pages.
Thoppilan et al., "LaMDA: Language Models for Dialog Applications", arXiv:2201.08239v3, Feb. 10, 2022, 47 pages.
Vaswani et al., "Attention is All you Need", arXiv:1706.03762v5, Dec. 6, 2017, 15 pages.
Verroios et al., "Context Trees: Crowdsourcing Global Understanding from Local Views", Conference on Human Computation and Crowdsourcing, Pittsburgh, Pennsylvania, United States, Nov. 2-4, 2014, 9 pages.
Wang et al., "Exploring Generalization Ability of Pretrained Language Models on Arithmetic and Logical Reasoning". arXiv:2108.06743v2, Oct. 19, 2021, 10 pages.
Wei et al., "Chain of Thought Prompting Elicits Reasoning in Large Language Models", arXiv:2201.11903v5, Oct. 10, 2022, 43 pages.
Welleck et al., "Consistency of a Recurrent Language Model with Respect to Incomplete Decoding", arXiv:2002.02492v2, Oct. 2, 2020, 16 pages.
Wu et al., "Polyjuice: Generating Counterfactuals for Explaining, Evaluating, and Improving Models", arXiv:2101.00288v2, Jun. 1, 2021, 17 pages.
Wu et al., "PromptChainer: Chaining Large Language Model Prompts through Visual Programming", arXiv:2203.06566v1, Mar. 13, 2022, 10 pages.
Xie et al., "How Influential are Mental Models on Interaction Performance? Exploring the Gap Between Users' and Designers' Mental Models Through a New Quantitative Method", Advances in Human-Computer Interaction, Online, Oct. 18, 2017, 15 pages.
YouTube, "AWS Summit Tel Aviv 2019 | Building Machine Learning Inference Pipelines at Scale", https://www.youtube.com/watch?v=8xkqYbnDefo, Retrieved on Jun. 20, 2024, 2 pages.
"PipelineModel", https://sagemaker.readthedocs.io/en/v2.14.0/api/inference/pipeline.html, retrieved on Jun. 20, 2024, 4 pages.
www.slideshare.net, "Building Machine Learning inference pipelines at scale | AWS Summit Tel Aviv 2019", https://www.slideshare.net/slideshow/building-machine-learning-inference-pipelines-at-scale-aws-summit-tel-aviv-2019/137463138, Mar. 21, 2019, Retrieved on Jun. 20, 2024, 8 pages.

\* cited by examiner

GIVEN THE FOLLOWING FEEDBACK, REWRITE IT INTO A FRIENDLY PARAGRAPH WITH CONCRETE SUGGESTIONS FOR EACH OF ALEX'S PRESENTATION PROBLEMS.

ORIGINAL FEEDBACK: ALEX COULD IMPROVE HIS PRESENTATION SKILLS. HE HAS TOO MUCH TEXT ON HIS SLIDES. HIS PRESENTATION MEANDERS FROM TOPIC TO TOPIC WITHOUT A CLEAR STRUCTURE. HE ALSO DOES NOT ENGAGE WITH HIS AUDIENCE WHEN HE PRESENTS.

MORE FRIENDLY FEEDBACK: ALEX HAS TOO MANY WORDS ON HIS SLIDES. HE SHOULD USE IMAGES AND BULLET POINTS TO HELP HIM GET HIS MESSAGE ACROSS. HE SHOULD ALSO HAVE A CLEAR STRUCTURE FOR HIS PRESENTATION. HE SHOULD ALSO ENGAGE WITH HIS AUDIENCE.

FIG. 1A

STEP 3  PREVIOUS STEP | NEXT STEP    TEMPERATURE: 

[[INSTRUCTION BLOCK]]

> WRITE ONE FRIENDLY PARAGRAPH THAT COVERS ALL THE PRESENTATION PROBLEMS AND SUGGESTIONS
>
> [[APPEND RUNNING BLOCKS]]

[[RUNNING BLOCKS]]

> [[PREPEND INSTRUCTION BLOCKS]]
>
> ALEX'S PRESENTATION PROBLEMS:
>
> 1) TOO MUCH TEXT ON SLIDES ⊖
>
> 2) MEANDERS FROM TOPIC TO TOPIC ⊖
>
> 3) DOES NOT ENGAGE WITH AUDIENCE WHEN PRESENTING. ⊖
>
>     
>
> SHORT SUGGESTIONS FOR IMPROVEMENT:
>
> 1) USE MORE GRAPHICS ⊖
>
> 2) USE BULLET POINTS ⊖
>
> 3) SPLIT THE TALK INTO SECTIONS ⊖
>
> 4) READ OUTLINES AND CHECK OFF EACH SECTION AS YOU GO ⊖
>
> 5) ASK THE AUDIENCE QUESTIONS ⊖
>
> 
>
> FRIENDLY PARAGRAPH:    
> ALEX, I YOUR PRESENTATION WAS INTERESTING! HOWEVER, I NOTICED THAT YOU HAVE A LOT OF INFORMATION ON YOUR SLIDES. IT MIGHT BE HELPFUL TO VARY PICTURES WITH TEXT SO THAT IT IS EASIER TO FOLLOW.

FIG. 2C

TRANSPARENT AND CONTROLLABLE HUMAN-AI INTERACTION VIA CHAINING OF MACHINE-LEARNED LANGUAGE MODELS

RELATED APPLICATION

The present application is based on and claims the benefit of each of U.S. Provisional Patent Application No. 63/251,264 having a filing date of Oct. 1, 2021, and U.S. Provisional Patent Application No. 63/315,648, having a filing date of Mar. 2, 2022, each of which is incorporated by reference herein in its entirety.

FIELD

The present disclosure relates generally to language modeling via machine learning. More particularly, the present disclosure relates to transparent and controllable human-AI interaction via chaining of machine-learned language models, including, in some instances, a graphical user interface for modularly building and/or editing a model chain that includes a sequence of instantiations of one or more machine-learned language models.

BACKGROUND

Language models include models (e.g., machine-learned models) that model a language. For example, a language model can receive and process input data to generate output data, where the input data and/or the output data are expressed in a language, such as, for example, a natural language (e.g., English, French, Mandarin, etc.) or a programming language (e.g., C+, Java, Python, etc.).

Recently, machine-learned language models which are significantly large (e.g., in number of parameters, volume of training data, complexity of architecture, etc.) have provided high quality language modeling. These significantly large models are referred to in the art as large language models (LLMs).

LLMs have introduced new possibilities for human-AI collaboration. Pretrained on a large number (e.g., billions) of inputs (e.g., from the Internet), LLMs like GPT-3 can now perform a wide variety of tasks, ranging from translation, to question answering, and even advanced story writing. Their success comes from their ability to adapt to various desired tasks purely using prompts (e.g., which may be natural language descriptions of the tasks). For example, one could adapt an LLM to act as a translation engine, simply by indicating the source and target languages with keywords: "English: Hello! French:" Based on this prompt, the model is likely to output the correct French translation: "Bonjour!"

The relative ease of natural-language-based prompt programming suggests that LLMs and other language models may be useful assistants for real-world tasks, with users customizing the models to their own needs. In this light, recent work in Natural Language Processing (NLP) has begun to examine the algorithmic capabilities of LLMs, mostly on synthesized tasks.

However, many real-world tasks can be quite complex (e.g., debugging software code, outlining long essays), and may present challenges for current language models (e.g., current LLMs) to solve from a single model run. For example, due to their limited ability to find, refine, and connect multiple function blocks, LLMs produce lower quality outputs when solving tasks that require multi-step reasoning. Likewise, they may fail to capture the subtleties of many tasks that balance multiple objectives simultaneously.

Besides being inherently limited for complex problems, LLMs are difficult to interact with, as they can be opaque and hard to debug or interpret. Since LLMs can take in any natural language prompts, end users may struggle to decipher how to change their prompts to remedy unexpected model outputs. They may also have difficulties understanding an LLM's capabilities and limitations. It is often unclear how a prompt can be changed to directly improve LLM performance on complex, multi-task problems.

Thus, systems and methods which improve the interpretability, controllability, and performance of language models are desired in the art.

SUMMARY

One example aspect of the present disclosure is directed to a computing system that chains one or more machine-learned language models to provide improved interpretability. The computing system includes one or more processors and one or more non-transitory computer-readable media that collectively store instructions that, when executed by the one or more processors, cause the computing system to perform operations. The operations include receiving an initial language input. The operations include processing the initial language input with a model chain to generate a language output. The model chain comprises a plurality of model instantiations of one or more machine-learned language models. Each model instantiation is configured to receive and process a model input to generate a model output, wherein at least a portion of the model input comprises a model prompt descriptive of a task performed by the model instantiation on the model input to generate the model output. The plurality of model instantiations in the model chain are arranged in a sequence such that, except for an initial model instantiation in the model chain, the respective model input of each model instantiation in the model chain comprises the respective model output from a sequentially previous model instantiation in the model chain. The operations include providing the language output as an output.

In some implementations, the operations further comprise: providing a user interface that visualizes the model chain and enables a user to modularly construct the model chain.

In some implementations, the operations further comprise: providing a user interface that enables a user to edit the respective the respective prompt to each model instantiation in the model chain.

In some implementations, the respective prompt to each model instantiation in the model chain is user-selectable from a number of pre-defined template prompts that correspond to primitive subtasks.

In some implementations, the operations further comprise: providing a user interface that visualizes and enables editing of the respective model output of at least one of the model instantiations in the model chain; receiving, via the user interface, a user input that modifies the respective model output of the at least one of the model instantiations in the model chain; and modifying the respective model output in accordance with the user input prior to inputting the respective model output into a sequentially subsequent model instantiation in the model chain.

In some implementations, the user input: alters the content of the respective model output of the at least one of the model instantiations in the model chain; deletes content from the respective model output of the at least one of the model instantiations in the model chain; or adds content to the respective model output of the at least one of the model instantiations in the model chain.

In some implementations, the one or more machine-learned language models comprise a single machine-learned language model; and the plurality of model instantiations comprise a plurality of model instantiations of the single machine-learned language model.

In some implementations, the one or more machine-learned language models comprise two or more different machine-learned language models; and the plurality of model instantiations comprise a plurality of model instantiations of the two or more different machine-learned language models.

In some implementations, the model chain is configured to perform a meta-task on the initial language input to generate the language output; and each of the plurality of model instantiations of the one or more machine-learned language models in the model chain is configured to perform a respective one of a plurality of different component subtasks of the meta-task. A meta-task can include a complex task that has or is the effectuated by performance of multiple component sub-tasks.

In some implementations, the respective model input to at least one of the plurality of model instantiations in the model chain comprises: the model output from the sequentially previous model instantiation in the model chain; and the model output from one or more model instantiations in the model chain that each precede the sequentially previous model instantiation in the model chain.

In some implementations, the language output comprises a natural language output.

In some implementations, the language output comprises a programming language output.

In some implementations, at least one of the machine-learned language models is stored separately from the computing system and accessed via an application programming interface.

Another example aspect is directed to a computer-implemented method to enable modular construction, control, and interpretability of a language model chain. The method includes receiving an initial language input. The method includes providing a user interface that visualizes and enables a user to edit a model chain configured to process the initial language input to generate a language output, wherein the model chain comprises a plurality of model instantiations of one or more machine-learned language models arranged in sequence such that, except for an initial model instantiation in the model chain, the respective model input of each model instantiation in the model chain comprises the respective model output from a sequentially previous model instantiation in the model chain. The method includes processing the initial language input with the model chain to generate the language output. The method includes providing, for display within the user interface, data indicative of the respective model output of one or more of the plurality of model instantiations in the model chain.

In some implementations, the method further comprises providing, for display within the user interface, the data indicative of the respective model output of the one or more of the model instantiations comprises providing the user interface in a chain view mode that depicts a structure of the model chain.

In some implementations, in the chain view mode, the user interface enables a user to edit the structure of the model chain.

In some implementations, providing, for display within the user interface, the data indicative of the respective model output of the one or more of the model instantiations comprises providing the user interface in a step view mode that enables a user to edit, for each of the one or more of the model instantiations, a respective prompt that forms a portion of the respective model input of the one or more of the model instantiations.

In some implementations, the method further comprises providing a tool that enables the user to add or remove model instantiations from the model chain and to edit connections between model instantiations in the model chain.

In some implementations, the method further comprises providing a tool that enables the user to zoom into a visual block associated with one of the model instantiations to edit the respective model input associated with the model instantiation.

In some implementations, the method further comprises providing a tool that enables the user to zoom into a visual block associated with one of the model instantiations to edit the respective prompt associated with the model instantiation.

BRIEF DESCRIPTION OF THE DRAWINGS

Detailed discussion of embodiments directed to one of ordinary skill in the art is set forth in the specification, which makes reference to the appended figures, in which:

FIG. 1A depicts an example attempt by a language model to perform a complex task in a single run.

FIGS. 2A-C depict an example interactive interface for interacting with model chains according to example embodiments of the present disclosure.

DETAILED DESCRIPTION

Figure 1B:
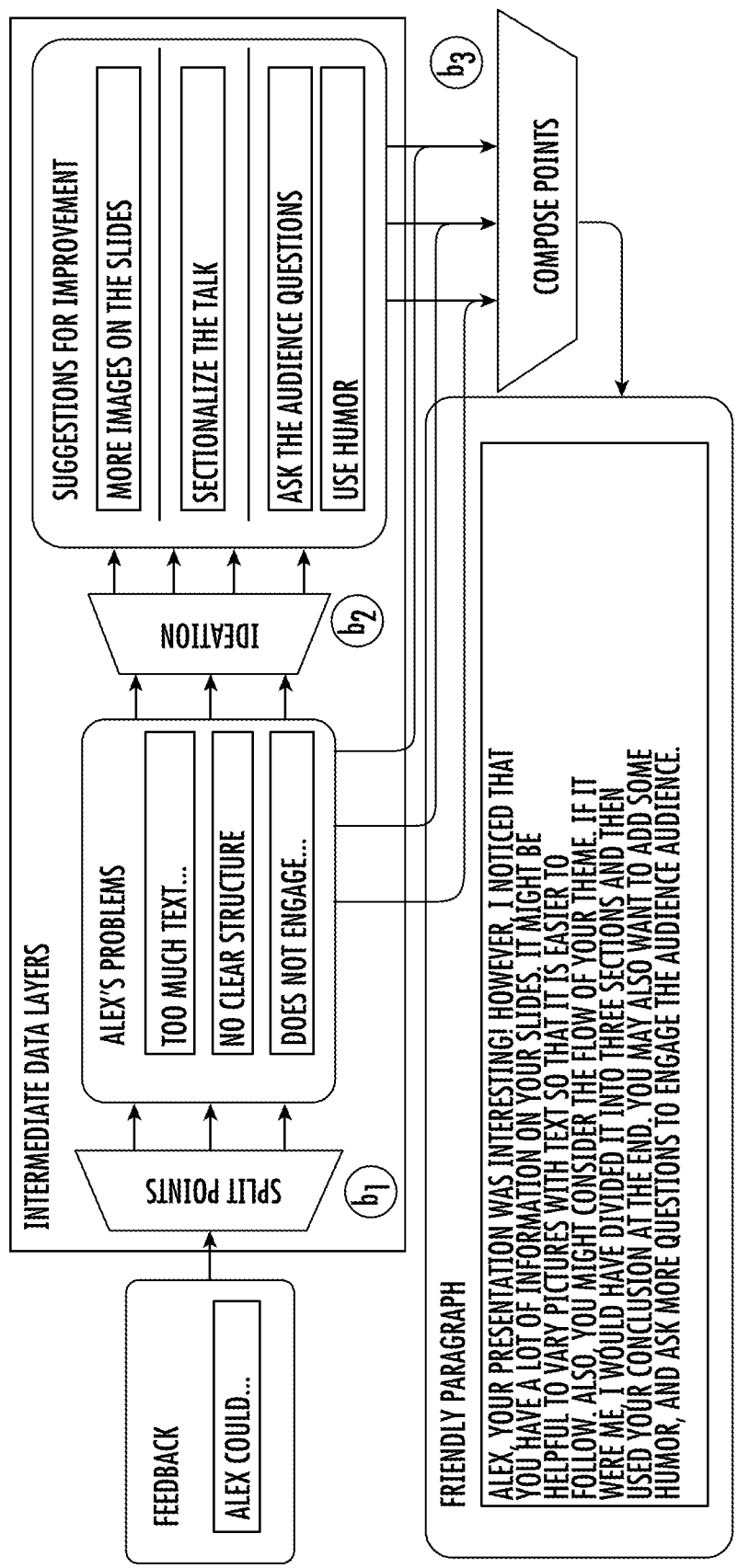
FIG. 1B depicts an example model chain performing the complex task via a chain of subtasks according to example embodiments of the present disclosure.

Generally, the present disclosure is directed to transparent and controllable human-AI interaction via chaining of machine-learned language models. In particular, although existing language models (e.g., so-called "large language models" (LLMs)) have demonstrated impressive potential on simple tasks, their breadth of scope, lack of transparency, and insufficient controllability can make them less effective when assisting humans on more complex tasks. In response, the present disclosure introduces the concept of chaining instantiations of machine-learned language models (e.g., LLMs) together, where the output of one instantiation becomes the input for the next, and so on, thus aggregating the gains per step.

According to one aspect, the present disclosure provides an interactive system where users can build and modify model chains, along with their intermediate results, in a modular way. Chaining in this fashion not only enhances the quality of task outcomes, but also significantly enhances system transparency, controllability, and the sense of collaboration. In some examples, the provided user interface can enable the user to: construct and/or edit a new or existing model chain and/or view and edit the inputs, outputs, and/or prompts for each instantiation within the chain. In some implementations, a user can be enabled to select a prompt for a given instantiation from a set of primitive operations defined herein which are useful for chain construction and refinement.

The proposed systems can be used in a number of different ways. As examples, users of the system can leverage sub-tasks to calibrate model expectations; compare and contrast alternative strategies by observing parallel downstream effects; debug unexpected model outputs by 'unit-testing" sub-components of a chain; and/or other interactions that can improve the interpretability, controllability, and/or performance of the model chain.

Thus, the present disclosure introduces the notion of "chaining" multiple language model instantiations together across a number of different model prompts. Chaining can help users accomplish complex tasks with language models (e.g., LLMs) in a way that is more transparent and debuggable. In some examples, chaining takes advantage of LLMs' unique ability to handle a variety of independent tasks (e.g., defined via prompts). In a chain, a problem can be broken down into a number of smaller sub-tasks, each mapped to a distinct step with a corresponding prompt; results of one or more previous steps can be aggregated in the next step's input prompt. Thus, chaining enables users to run one or more language models (e.g., in some cases the same LLM) on multiple sub-tasks, with each sub-task having a higher probability of success (e.g., as opposed to solving the entire task in one go).

In addition to potentially improving outcomes, chaining opens up new channels for fine-grained human feedback and control. In particular, according to another example aspect, the present disclosure provides interactive user interfaces that expose these additional "knobs" to end users. For example, an interactive user interface can display a live visualization of the model chain structure and can allow users to customize chains at various levels. As examples, the user can be enabled to: iterate on or otherwise modify the local prompts per step; edit intermediate data transformed between steps; and/or reconstruct or modify the architecture of flow of the model chain.

In some implementations, users can be enabled to select from a number of pre-defined prompts. For example, each pre-defined prompt can correspond to a primitive operation that includes default prompting and data structures. These pre-defined prompts can help the user to perform effective task decomposition and to better understand how certain steps feed into each other. Likewise, pre-defined or default chains can be used as a starting place for various tasks as well.

Example experiments conducted using the disclosed techniques demonstrated an improvement in outcomes (e.g., accuracy). For example, example experiments showed that participants typically achieved higher-quality outcomes using chaining, and that chaining improved key dimensions of the human-AI experience such as: transparency, controllability, collaboration, and mental support.

The systems and methods described herein can also be used for improvements beyond immediate task accomplishment. For example, users can: model expectations using the smaller scope of sub-tasks; explore alternative prompting strategies by comparing parallel downstream effects; debug unexpected model output by isolating and "unit-testing" different parts of a chain; and/or other meta- or single-step-interactions to tweak and understand model performance. As further examples, chaining can also provide intermediate rationales when the final gold answer is unclear and/or support rich prototyping on AI-infused applications. These improvements in task performance and user experience can be achieved without changing (e.g., re-training) the underlying machine-learned model (e.g., the LLM) itself.

One concept leveraged by the present disclosure is that one way to improve the explainability and debuggability of an otherwise opaque, black-box LLM is to have it do less: breaking a problem up into smaller problems, having the model solving each (smaller) problem separately, showing the intermediate results, and allowing users to edit those results.

The present disclosure provides a number of technical effects and benefits. As one example, the present disclosure introduces the notion of language model chaining. Through a series of chained model calls, each targeting a small and well-scoped sub-task, one or more language models (e.g., a single LLM) can contribute or perform multiple sub-components of a task.

As another example technical effect and benefit, the present disclosure provides designs and implementations of building blocks for constructing and interacting with model chains. In some examples, these include a set of primitive language model operations representing functions well-scoped for a single run of a language model. As another example, provided are interactive interfaces that display the intra- and inter-step structures of a model chain. Users can run chains step-by-step, and customize them at various granularities (e.g., customizing intermediate data, rewiring steps, etc.). As such, the user interface can guide the user in performing the particular task by providing primitive operations, displaying the intermediate data and connection structure of the system to enable the user to view the effects of changes in the system interactively and to determine the correct input prompts and structure of the system. The user interface provides an internal view of the state of the system and enables the user to better operate the system. This additionally provides a better means of user input for operating the system compared to for example, a single monolithic LLM which as discussed above can be difficult for a user to determine the correct input prompt to obtain a desired output.

As another example technical effect and benefit, the systems and methods of the present disclosure can increase system transparency, controllability, and task outcomes. Importantly, in some implementations, these gains are achieved without any changes (e.g., re-training) to the underlying model (e.g., the underlying LLM). Thus, example implementations of the present disclosure can lead to improved performance (e.g., accuracy or other measures of quality) without needing to re-training or otherwise modify a language model. Obviating the need to re-train a model can save computational resources such as processor time, memory usage, network bandwidth, etc. In particular, in the case of a LLM, even a single re-training can consume a very significant amount of resources, given the large size of the model.

More generally, by providing increased transparency and granular controllability, the systems and methods described herein can enable a user to achieve a desired outcome more quickly, resulting in fewer design iterations, testing iterations, and training iterations. The net result is a significant reduction in computational resources that are required to achieve the desired outcome, all while providing a more user-friendly and interpretable interface to the internal operations of the model chain.

Although example aspects of the present disclosure are discussed herein with reference to language models, the proposed techniques are equally applicable to data domains other than language. For example, the inputs, outputs, and/or prompts to any of the model instantiations can include data in a domain other than language. As one example, a multi-modal machine-learned model may be enabled to perform a task on input data that includes image data to perform a task which is specified by a natural language prompt (e.g., "find all dogs in this photo"). Thus, descriptions contained herein relative to language models can also be applicable to machine-learned models that process data that is not language data or that perform tasks which are not typically considered language modeling tasks.

With reference now to the Figures, example embodiments of the present disclosure will be discussed in further detail.

Example Model Chain and Illustration of Benefits

FIGS. 1A and 1B depict an example illustration of the benefits of the present disclosure. In particular, FIG. 1A depicts an example attempt (and general failure) by a language model to perform a complex task in a single run; while FIG. 1B depicts an example model chain performing the complex task via a chain of subtasks according to example embodiments of the present disclosure.

More particularly, FIG. 1A demonstrates an example of a peer review rewriting task, which is complex and multi-faceted. In the peer review rewriting task in FIG. 1A, while the LLM can both ideate suggestions and adjust the writing tone in isolation, it lacks the capability to perform both concurrently in an end-to-end manner. As a result, it produces a mediocre paragraph (e.g., shown at the bottom as 'more friendly feedback') that only meets a few requirements. Furthermore, there are no obvious edits (e.g., to the original prompt) that can, for instance, encourage the model to add more suggestions regarding "too much text on slides" to the final paragraph in FIG. 1A.

Thus, a single call to the LLM used in FIG. 1A fails to rewrite peer review paragraphs to be more constructive and friendly. In particular, even though the prompt describes the task and identifies text sections, the generated text remains mostly impersonal and contains vague suggestions.

In contrast, example systems and methods of the present disclosure can assist in resolving this issue by chaining multiple prompts together, so that the problem is broken down into a number of smaller sub-tasks, each mapped to a distinct step with a corresponding prompt. In particular, in FIG. 1B, while the underlying LLM remains the same as was used in FIG. 1A, by splitting presentation problems and ideating suggestions per problem into distinct subtasks, the final composed paragraph is significantly more comprehensive in addressing all problems and has a more constructive tone.

Specifically, in FIG. 1B, a LLM chain is used that includes three steps, each for a distinct sub-task: first, a 'split points' step/prompt that extracts each individual presentation problem from the original feedback; second, an 'ideation' step/prompt that brainstorms suggestions per problem; and third, a 'compose points' step/prompt that synthesizes all the problems and suggestions into a final friendly paragraph. The result is noticeably improved.

In addition to potentially improving outcomes, chaining also opens up new channels for fine-grained human feedback and control. For example, thanks to the separate suggestion Ideation step in FIG. 1B, chaining allows users to customize which suggestions to include in the final paragraph, an operation that is unavailable in FIG. 1A (as explained before).

Example Techniques for Chaining Models

Example techniques provided herein enable a user to generate or use a model chain. Chaining models can include or result from the process of breaking up complex tasks into smaller steps, where each step can be completed by an independent run of a model instantiation, and where the output of one step is used as input for the next. As a result of accumulating the gains across multiple runs, model chains can solve tasks that would be difficult for a single model (e.g., a single LLM) to perform in a single run. Thus, LLM Chaining is particularly beneficial for tasks that are challenging for an LLM to complete in a single pass but can be easier to accomplish through a series of smaller tasks that an LLM performs well.

The following paragraphs summarize common challenges LLMs face and then describe a set of primitive operations that represent a space of tasks that appear to be well handled by a single run of LLM and that can be used to address the summarized challenges.

Categorizing Primitive Operation by the Challenges they Address

There are three main challenges that LLMs face or scenarios that LLMs are less capable of handling:

LLMs lack multi-step reasoning capabilities. Because LLMs are designed to grasp the form of language, rather than the meaning, they perform poorly on tasks like sequential math problems, multi-hop question answering, or those that require branching logics.

LLM suffers from exposure bias. Because LLMs typically generate texts sequentially in an autoregressive manner (tokens generated by the models are themselves used to predict the next word), errors or imperfections from previous runs can accumulate. Thus, LLMs are less likely to perform well when generating long bodies of text. Exposure bias can also cause LLMs to produce redundant content, in some severe cases repeating the same phrase over and over again. As a result, they are less likely to generate texts with diverse themes or arguments (e.g., suggestions for all the three problems in FIG. 1B).

LLMs are sensitive to input prompts. Their effectiveness varies with the prompt formats and paraphrases and they also tend to favor certain types of input. Generally, nouns and verbs in the input are more important than adjectives and function words, and unnatural text tend to be less efficient.

Meanwhile, the unique strengths and capabilities of LLMs include aiding with email responses, detecting hate speech, extracting plans, etc.

With the above challenges in mind, the present disclosure provides a number of example primitive operations, each with a unique functionality helpful for addressing the challenges. In particular, Table 1 below shows how derived operations fall into three categories and can address the aforementioned three challenges:

TABLE 1

Example primitive operations grouped according to the intended objectives.

(a) Validate and categorize the input

Def. Classification: Assign the input to categories. Most useful for branching logics and validation
Ex. Classify if the question is answerable.
Question: What is the square root of banana
Is answerable (Yes/No): No (b) Gather additional information from LLMs Def. Factual Query: Ask the model for a fact
Ex. Given the US state, find the population.
US State: Washington
Population: 7.6 Million
Def. Generation: Ask the model to do some creative "hallucination" on the input.
Ex. Given the topic, create a two-sentence horror story.
Topic: breakfast
Two-sentence horror story: He always stops crying when I pour the milk on his cereal.
I just have to remember not to let him see his face on the carton.
Def. Ideation: Ask the model for a list of ideas or examples.
Ex. Given Alex's presentation problems, the following is a list of suggestions.
Alex's problems: Too much text
Short suggestions for improvement:
1) Use more graphics
2) Use bullet points (c) Re-organize the input Def. Info. Extraction: Extraction information from the context
Ex. Given text, extract airport codes per city
text: I want to fly from Los Angeles to Miami
airport codes: LAX, MIA
Def. Rewriting: 1-1 mapping that changes the input to more machine-readable formats (e.g., json to natural language).
Ex. Rewrite the first-person text into third-person.
first-person text: I decide to make a movie
third-person text: He decides to make a movie.
Def. Split Points: 1-N mapping that is particularly useful for splitting contexts.
Ex. Split the feedback paragraph into a list of Alex's presentation problems.
Feedback: Alex could improve his presentation skills. He has too much text on his slides. His presentation meanders from topic to topic without a clear structure. He also does not engage with his audience when he presents.
Alex's problems:
1) Too much text
2) No clear structure
3) does not engage with audience
Def. Compose Points: N-1 mapping, the reverse operation of decomposition; merge multiple results back
Ex. Write one friendly paragraph to cover all the problems and suggestions for improvement.
Alex's problems: 1) Too much text; 2_No . . .
Suggestions: 1) More image images on the slides; . . .
Review: Your presentation was interesting! However, I noticed that you have a lot of . . .

First, an LLM may have difficulty applying common sense reasoning or complex inferences to nuanced problems, as previously mentioned. The example Classification operation can help address this by acting as a validation check or triage, before more steps are carried out (Table 1a). For example, a chatbot may need to first classify the type of question a user is asking before providing adequate responses.

Second, to alleviate exposure bias (e.g., the inability to generate long and diverse texts), some operations can be used to query small chunks of new contents (see, e.g., Table 1B), so as to gradually build up the diversity and length. Three example ways to get new content include querying facts, generating imaginations, and ideating lists of contents. For example, in the peer review rewriting scenario (FIG. 1B), the separate Ideation per problem prevents suggestions for one criticism from being influenced by the other two criticisms.

Finally, because LLMs may struggle with certain input prompt types, reorganizing the prompt can be helpful when its original form is convoluted. The example Rewrite and Compose point operations transform inputs into more parsable forms; the example Information Extraction elicits concise information; and the example Split point splits text into smaller and more manageable units—all are summarized in Table 1C. As shown in an example case study on visualization debugging, translating JSON-formatted specifications to natural language descriptions helps LLM parse the corresponding visualization.

These operations naturally support a variety of crowdsourcing workflows. For instance, Information Extraction and Classification are crucial components of the Find-Fix-Verify workflow for effective text editing (e.g., the "fix" step may be Rewriting, Compose Points or Generation, depending on the text goal). But in addition to crowdsourcing workflows, which mainly emphasize task decomposition and re-composition (i.e., how to arrive at sub-tasks), the example operations further scope the LLM applicability within each step (i.e., what each sub-task should be.) This is essentially due to the different objectives of task decomposition: Crowdsourcing reduces cognitive load and duration of a single sub-task, while still assuming that all the resulting tasks are feasible with minimal guidance. By contrast, LLMs are more restricted in applicability, and require more rigorous instructions to perform desired functions.

Requirement Analysis

The following paragraphs summarize common challenges authoring LLM chains face which are addressed later in the paper through interface design.

There are three main challenges that authoring LLM can run into:

The disconnection between LLM prompt and chain construction. LLMs can take unstructured (open-ended language) prompts as input. However, in some cases they may lack explicit "function signatures." Thus, in some cases LLM prompting can be disconnected from the overarching chain construction.

The complexity of LLM functions and data transformations. The versatility of LLMs means that they can produce outputs in arbitrary formats, making it nontrivial to transform the output of upstream LLM steps so that they will be compatible with the input to downstream LLM steps.

The likelihood of cascading errors. Sub-optimal or even unsafe output in a single step could potentially lead to cascading errors across an LLM chain.

With the above challenges in mind, the present disclosure provides a number of proposed interface design features, each with a unique functionality helpful for addressing the challenges.

Designing Example Operations for Model Chain Construction

Example model chains can be constructed by connecting these operations (and/or others) through shared inputs and outputs (e.g., which can be called data layers). In FIG. 1B, step b1 employs operation Split on the input of Feedback to output Alex's problems. Then, the connected step b2 utilizes the generated problems to ideate suggestions for improvements.

Thus, model chain construction can benefit when operations clearly define what data to take in, how to process them, and what data they shall pass on. Therefore, example design operations can be generated with reference to the following three guidelines. As a walkthrough example, this section explains how the parameters in Table 2 below help build the Ideation row in Table 1 (also step b2 in FIG. 1).

Some example implementations define prompt templates per operation primarily with task descriptions. They specify the desired model functionality in an application-agnostic manner with key verbs and placeholders for application-specific details, improving model generalization. For example, Table 2 describes Ideation through "Given_____, the following is a list of_____." Following the prompting conventions, some examples also incorporate prefixes—names of data inputs and outputs like Alex's problems—in the template, to (1) separate text sections, (2) re-emphasize the goal of generation, and (3) closely link the generations to the keywords in descriptions. Some example implementations further include temperature, a parameter that influences the randomness of the LLM generation. Ideation requires much higher temperature (e.g., t=0.7) than, for example, the more deterministic Classification operation (e.g., t=0.0).

Second, it can be beneficial for operations to be flexible to take customized data layers as inputs and outputs. As in Table 2, the blanks in the prompt templates can take a number (e.g., two) types of information for each data layer: (1) a prefix that denote their names and (2) a detail string that optionally explaining additional information. Then, a user can build concrete model steps (prompts therefor) simply by filling in the templates with data layer definitions. The Ideation example in Table 1 fulfills the template with two data layers: (Alex's problem, Alex's presentation problem) and (short suggestions for improvement, suggestions).

Third, it can be beneficial for operations to handle parsing and restructuring inputs and outputs, as the data layers may take different formats in different steps. For example, in the Ideation step (b2), Alex's three presentation problems are addressed in parallel, creating three paths of model calls. But later in Compose Point (b3), the three sets of problems and suggestions are merged into one. Some examples define required data types per operation, along with corresponding prompting tweaks and parsers. To reflect Ideation which accepts a single string, and outputs a list of ideas, its prompt template can include, e.g., a "1)" right before the output text, to encourage the generation of a list, and the output is also parsed into lists based on such numbering.

These example defaults not only provide stable and consistent starting points on engineering and chaining model

TABLE 2

Example implementation for Ideation in Table 1 with (1) a prompt template that involves the task description, datatypes, and placeholders for inputs and outputs; and (2) a default temperature that controls the randomness of the LLM generation.

| | Default Parameters | Constructed Prompt Template |
|---|---|---|
| Temperature | 0.7 | Given [detail-1], the following is a list of [detail-2]. |
| Data Layers | [prefix-1], [detail-1] → [prefix-2], [detail-2] | [prefix-1]: (string) |
| Description | Given _, the following is a list of _. | [prefix-1]: (string) |
| Typings | string → list of strings | [prefix-2]: (list of strings) |

First, it can be beneficial for operations to invoke the desired functionalities (Ideation, Split points, etc.) As mentioned above, LLMs are capable of in-context learning through textual prompts. Such prompts usually includes either the natural language task description ("Given problem, the following is a list of suggestions"), or some demonstrative "few-shot" examples ("Problem: too much text; Suggestion: (1) use more graphics, (2) use bullet points"), or a combination of both.

functions across domains, but also specify examples of how end users can interact with the model chains. When constructing a model chain, for example, users can define the data layers and select the operations; and if they wish to customize a step, they might also refine the task description, or optionally include application-specific example tasks. The next section demonstrates examples of how these designs can serve as the underlying data structure for interactive model chain execution and customization.

Example User Interfaces

This section describes interactive interfaces which support users in interacting with model chains, including modifying the prompts and intermediate model outputs for each step, and customizing the Chains. The example interfaces described in this section are provided as examples only. Other interfaces with more or less functionality or granularity can be used.

Example Design Rationales

Three example design rationales for certain example model chain interfaces are as follows:

Visually reflect the underlying Chain structure. Some more simplistic example implementations can explain the chain structure using a static slide deck that highlights the data produced at each step. However, other, richer example interfaces can provide more information that helps users to understand the operations taken at each step to arrive at these data layers (e.g., split points, ideation, compose points). This can let users visually track progress through the model chain. To achieve this, some example interfaces can reflect the data layers, as well as the data operations and prompt details within each step of the Chain.

Provide controls at different granularities. Some users favor flexible controls. Therefore, some example interfaces can support modification of model chains both locally (e.g., changing one task description) and globally (e.g., changing how the steps are connected). Further, the ease of interaction can be in line with the level of control. Users frequently make local fixes on intermediate data points that flow between model steps, and therefore example interfaces can allow in-place editing, without explicitly switching to editing mode. Rewiring the entire chain, on the other hand, has more impactful consequences and tends to overwrite the underlying structure. Therefore, some example implementations hide this level of modification by default.

The structured controls should still reflect the natural language interaction supported by LLMs. Some example implementations can format the data as structured tables with each data layer being a column. However, making text edits in cells may feel unnatural as users may lose the sense of interacting with the model through natural language. Therefore, to retain a natural interaction experience, some example interfaces can keep these structures as in-line text fields.

Example Interface Design and Implementation

Figure 2A:
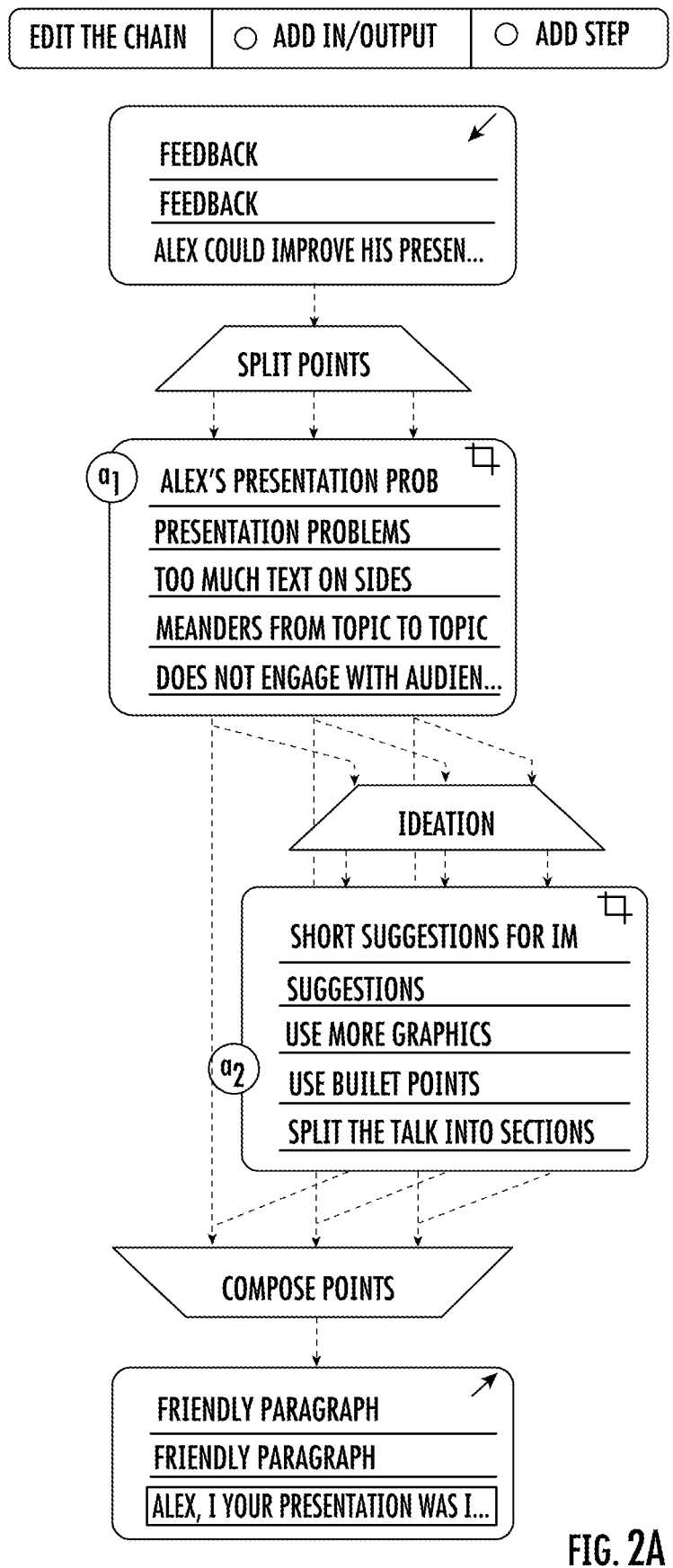
Figure 2B:
Figure 2B:
Figure 2B:
Figure 2B:
Figure 2B:
Figure 2B:

One example interface design which follows the rationales described above is shown in FIGS. 2A-C, FIGS. 3A-B, 4 and 5A-F. The interface in FIG. 2A-C, FIGS. 3A-B, 4 and 5A-F includes or is operable in three primary views or modes: the chain view (FIGS. 2A 3A, 4 and 5A-F), the step view (FIGS. 2B/C), and the node view (FIG. 3B).

Chain view. FIG. 2A depicts the high level chaining structure through a flow chart. It contains three primary visual cues that closely reflect the underlying design described above. First, the example interface can use grey glyphs to represent model operations, with shapes indicating 1-1 (rectangle), 1-N (trapezoid), and N-1 (inverted trapezoid) data mappings. Clicking on these glyphs can allow users to choose which step to zoom into, and the step view would change in response (as discussed later.) Then, to represent data layers, the example interface can use rectangles with colored stripes, and can include prefixes and details in the rectangle. Users can also preview the data entries through rows e.g., FIG. 2a2), which are updated after each LLM execution, and thus track model chain execution progress. Finally, the example interface can link these elements with dotted-line arrows to highlight which data output serves as the input to which step and use the arrow number to roughly reflect whether the step expects a single input/output (e.g., a single feedback to Split points), or multiple of them (e.g., multiple problems going into Ideation).

Figure 3A:
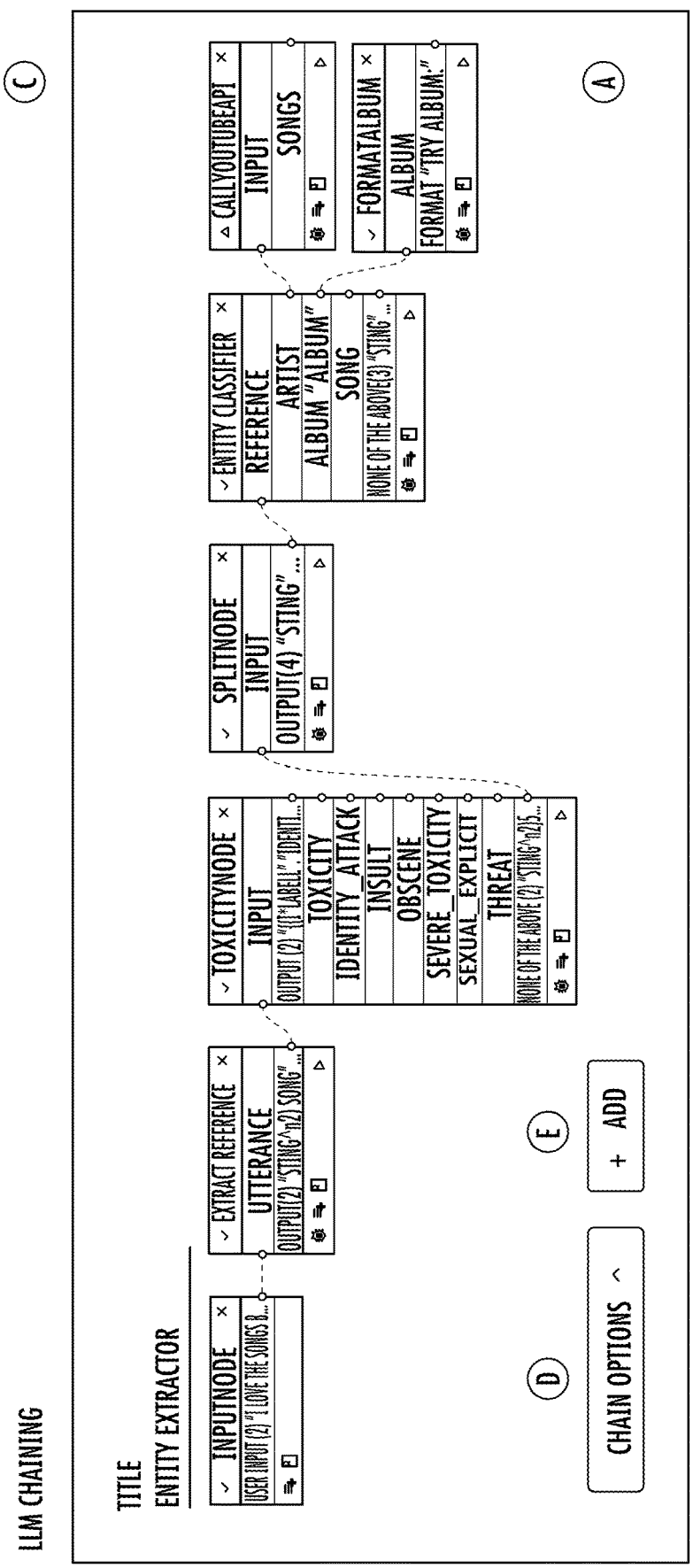
FIGS. 3A-B depicts another example interactive interface for interacting with model chains according to example embodiments of the present disclosure.
Figure 3B:
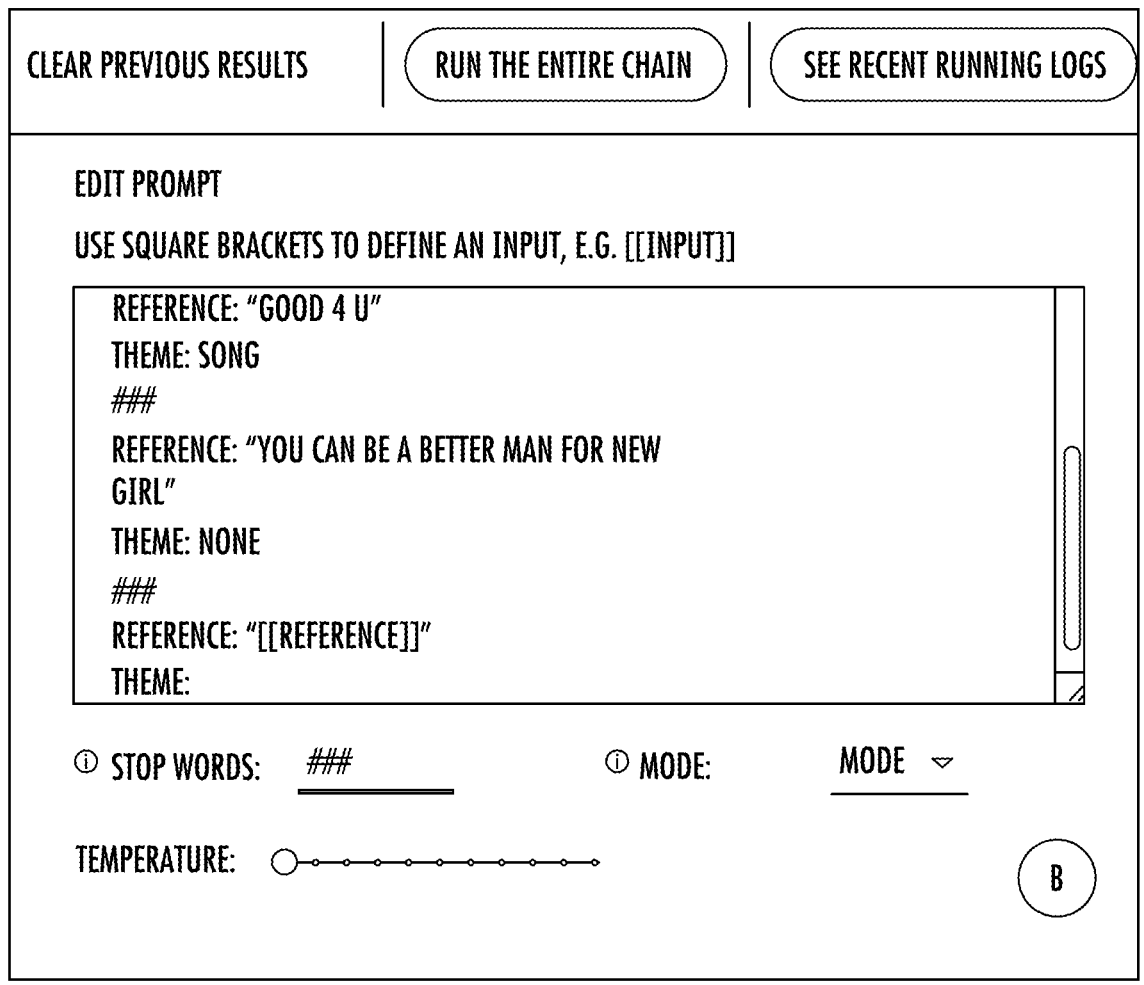
Figure 4:
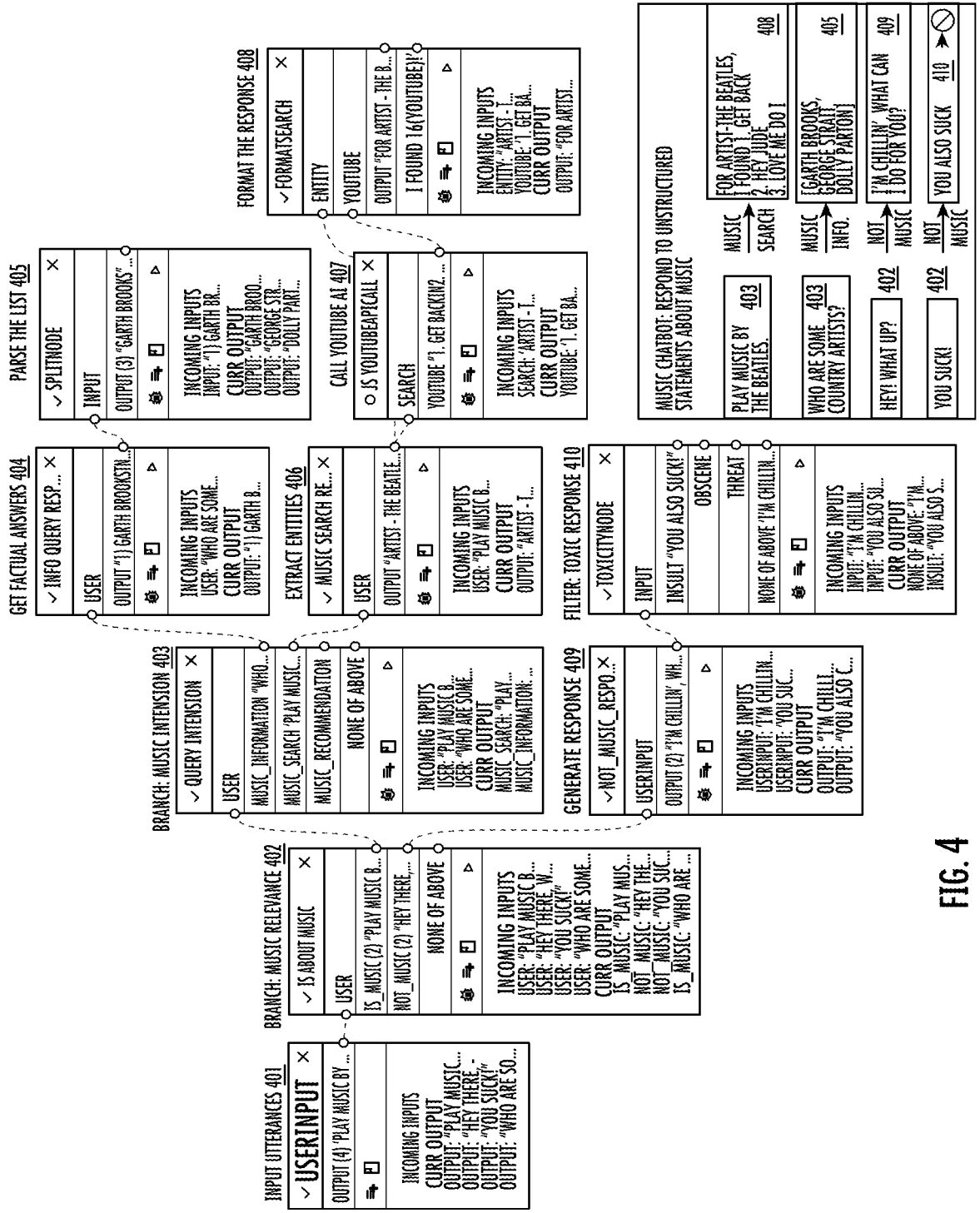
FIG. 4 depicts another example interactive interface for interacting with model chains according to example embodiments of the present disclosure.
Figure 5A:
FIGS. 5A-E depict another example interactive interface for interacting with model chains according to example embodiments of the present disclosure.
Figure 5B:
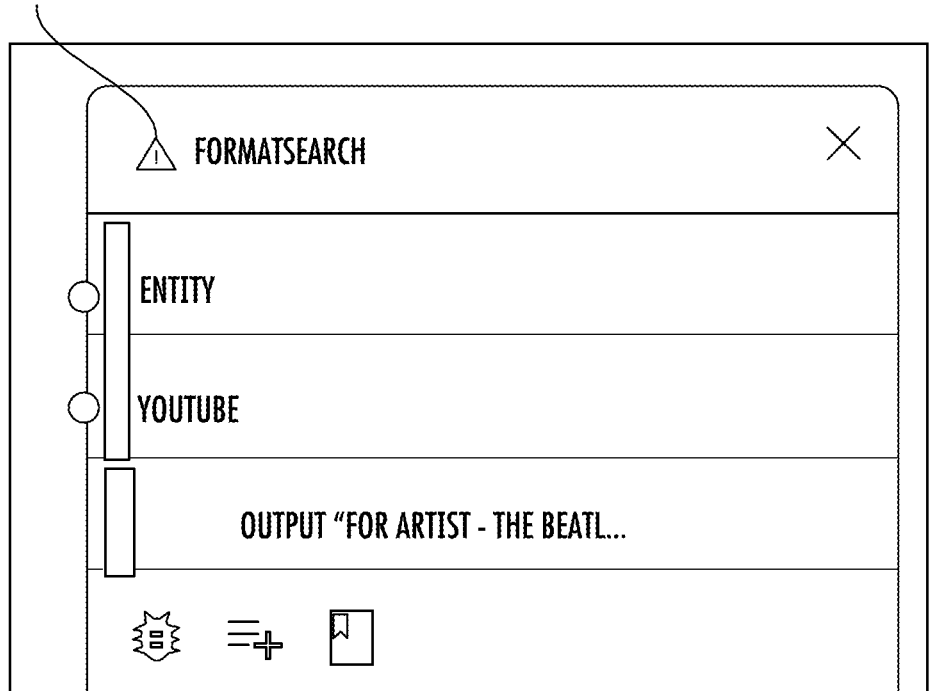
Figure 5C:
Figure 5D:
Figure 5E:
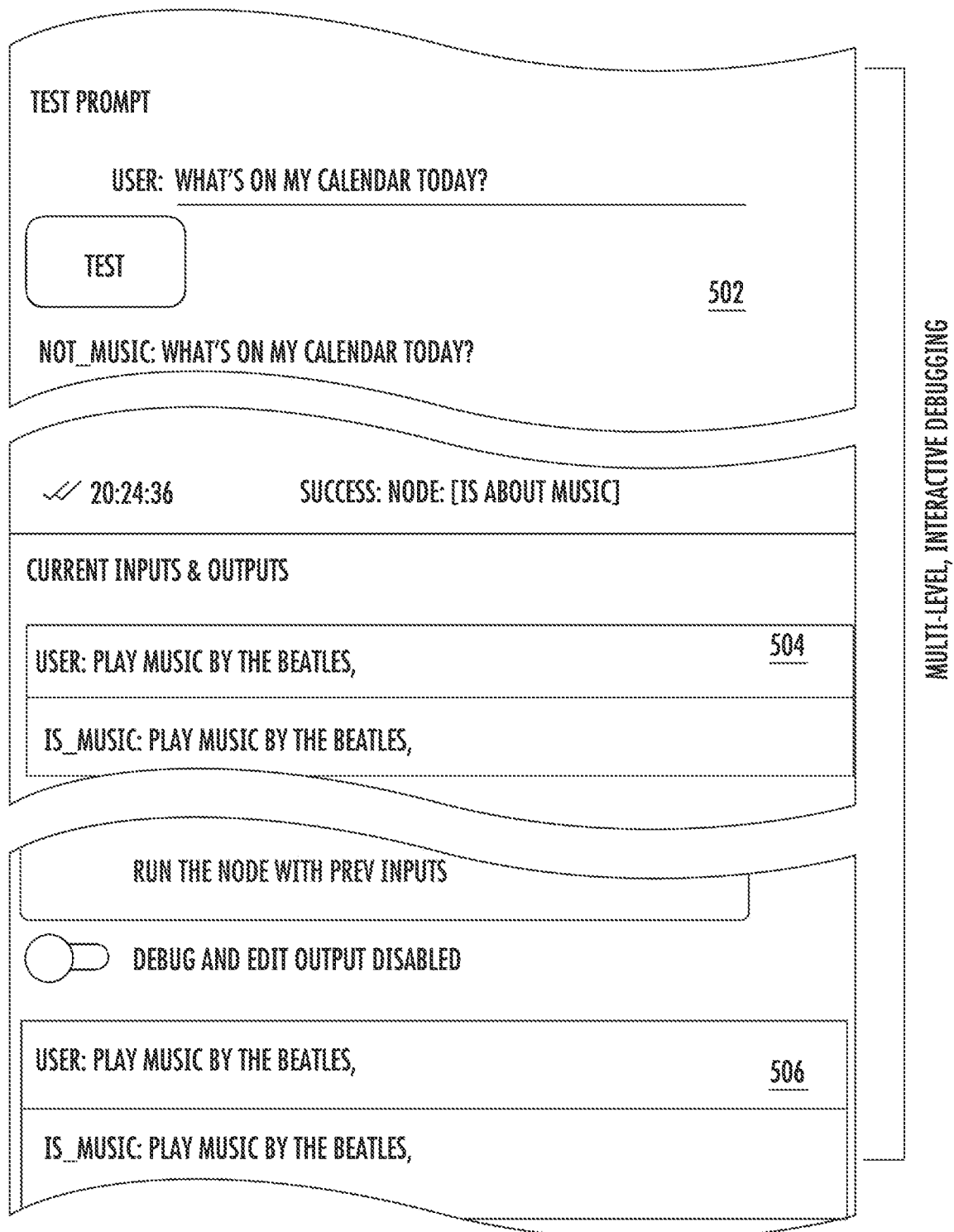
Figure 5F:
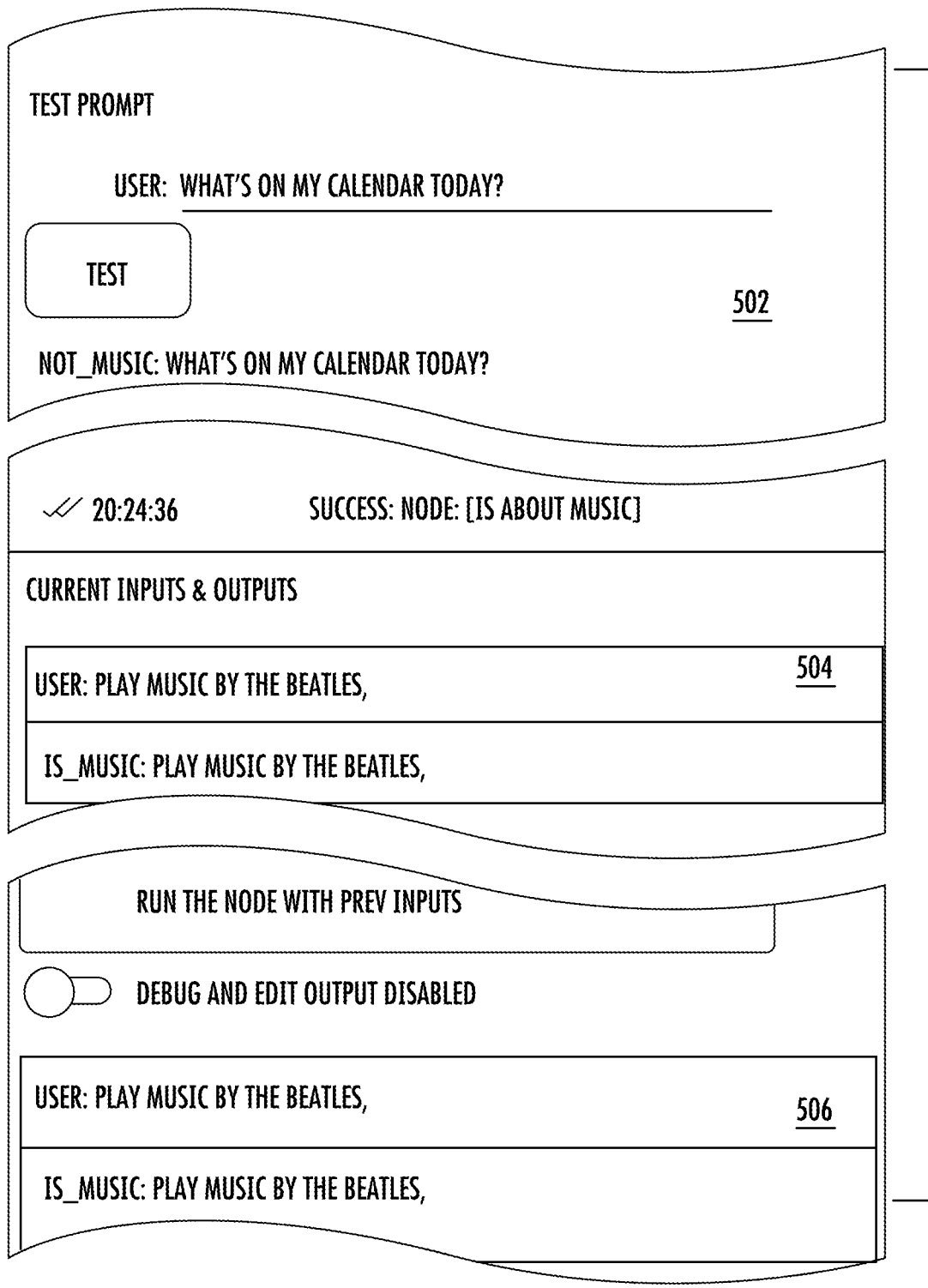
Figure 6A:
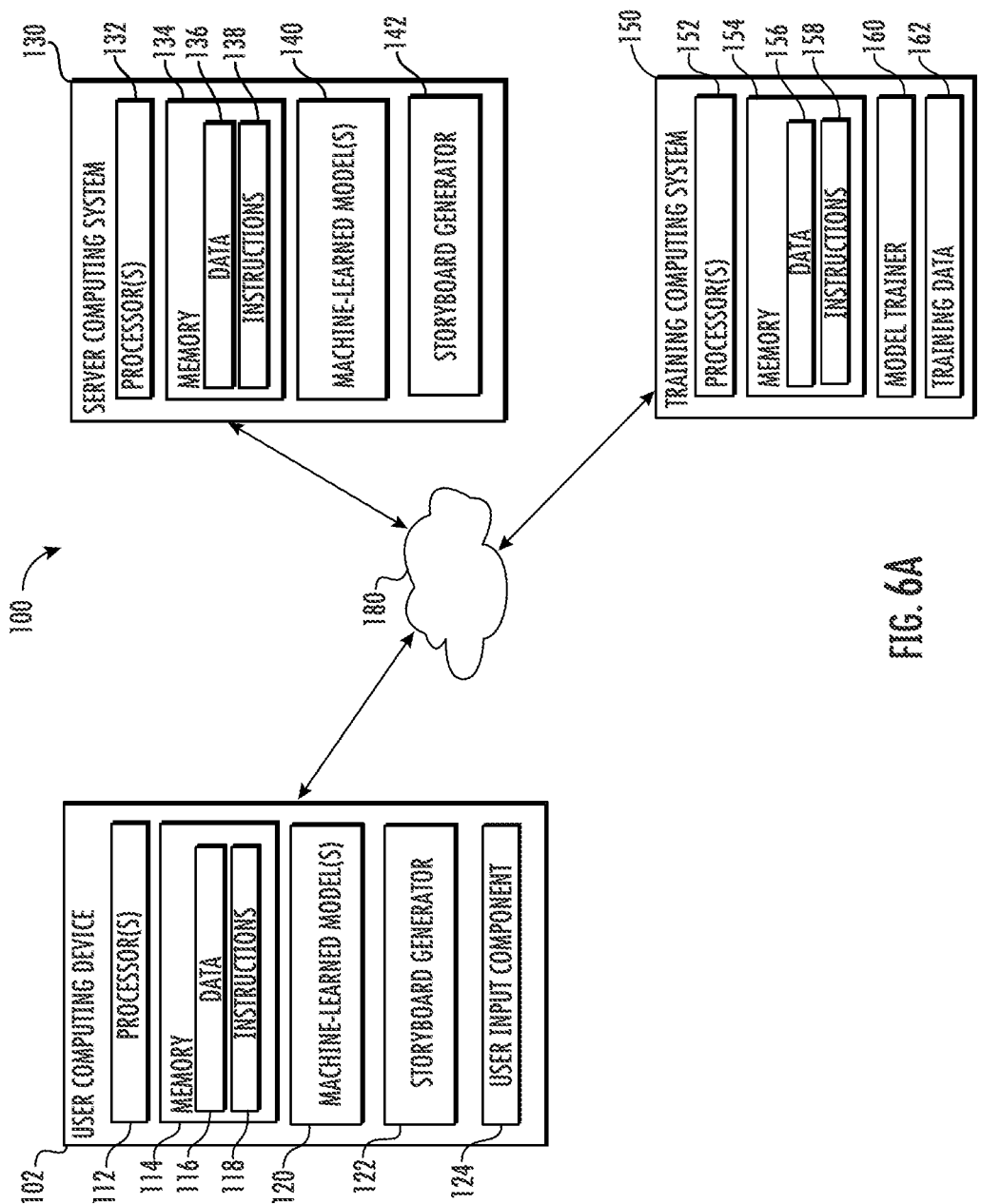
FIG. 6A depicts a block diagram of an example computing system according to example embodiments of the present disclosure.
Figure 6B:
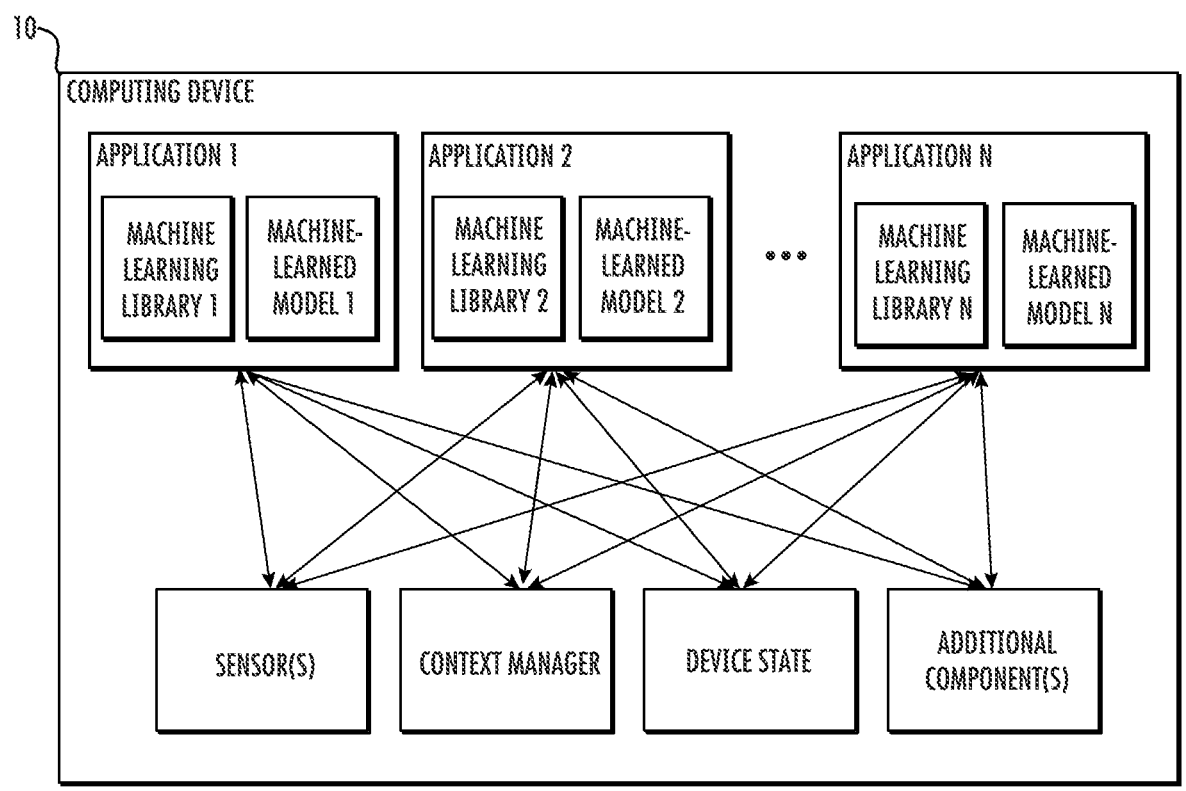
FIG. 6B depicts a block diagram of an example computing device according to example embodiments of the present disclosure.
Figure 6C:
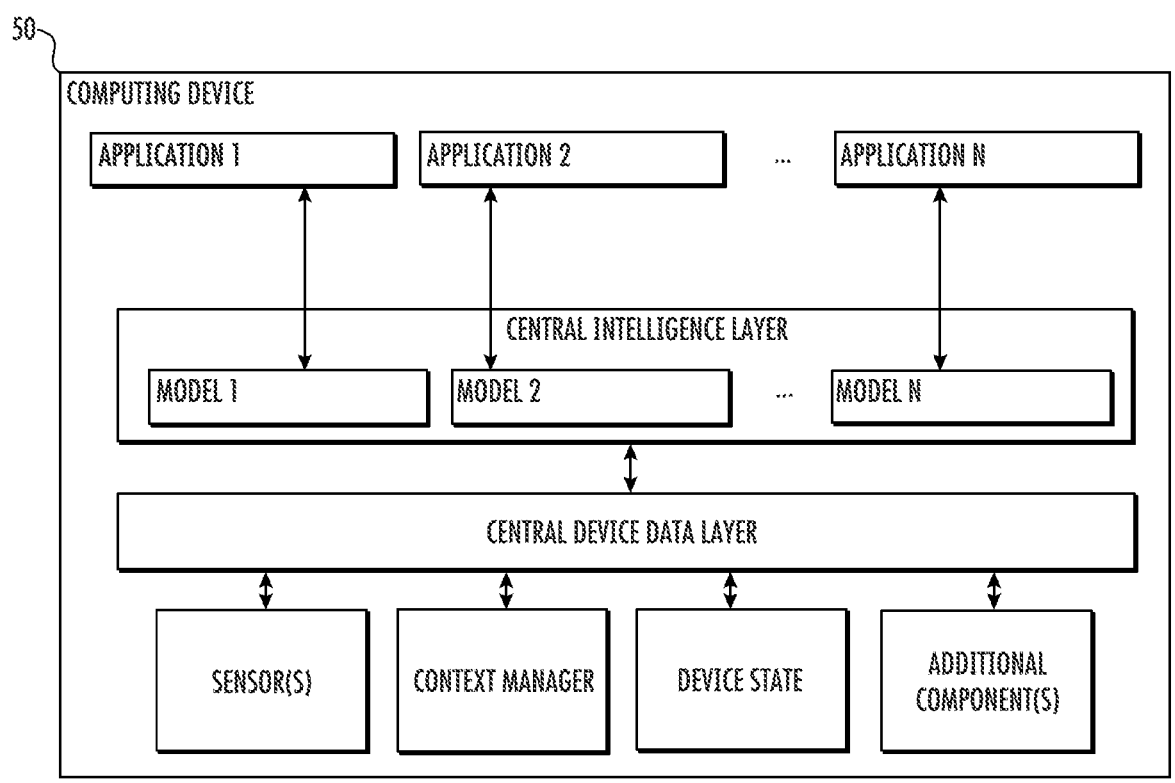
FIG. 6C depicts a block diagram of an example computing device according to example embodiments of the present disclosure.

FIG. 3A depicts another high level chaining structure through a node-link diagram. Each rectangle may depict a node which can represent a single step in the chain, with the edges between them denoting how these nodes are connected, or how the output of one node gets used as the input to the next. In particular, as shown in FIG. 5A-E (a zoomed-in node 402 from FIG. 4), each node can have one or more named inputs and outputs (e.g., "user" is a named input and "is_music" is a named output in the "Is about music" step). Users can connect two nodes by dragging an edge from the output of one node e.g., "is_music" to the input of the next e.g., user 403 FIG. 4. Node previews can be provided to increase chaining transparency, including a status icon highlighting whether the node contains errors as seen in FIG. 5C an on-branch preview (e.g., FIG. 5C, "Hey there, what's up" displayed after "not_music"), and an optional detailed preview of input and output data, as seen in FIG. 5D.

Furthermore, several types of nodes can be defined. In particular, users can choose from a node library. For instance, the node library can provide a user one or more available node types from which a user can select at one or more nodes. Table 3, below, shows example node types which can be defined.

TABLE 3

Examples of node types, including core LLM nodes, helper nodes for data transformation and evaluation, and communication nodes for exchanging LLM data with external users or services.

| | Node Type | Description | Example in FIG. 2 |
|---|---|---|---|
| LLM | Generic LLM | Use the LLM output directly as the node output. | 4, 6, 9 |
| | LLM Classifier | Use LLM output to filter and branch out inputs. | 2, 3 |
| Helper Function | Evaluation | Filter undesired LLM outputs, or Re-ranking multiple outputs based on human-designed criteria, e.g., whether the reply is concise, polite, etc. | 10 Toxicity classifier |

TABLE 3-continued

Examples of node types, including core LLM nodes, helper nodes
for data transformation and evaluation, and communication nodes
for exchanging LLM data with external users or services.

| | Node Type | Description | Example in FIG. 2 |
|---|---|---|---|
| | Processing | Pre-implemented JavaScript functions for typical data transformation (between a single string and a list of strings). | 5 split by number |
| | Generic JavaScript | Customized JS functions, in case pre-defined helpers are insufficient | 8 format the query |
| Communic. | Data Input | Define the input to a chain. | 1 |
| | User Action | Enables external (end user) editing on intermediate data points. | Pick from LLM top-3 outputs (FIG. 5 1) |
| | API Call | Call external functions to connect professional services with LLMs | 6 Call YouTube API |

In particular, there may be two overarching types of LLM nodes; users can implement these nodes by providing a natural language prompt, call an LLM with the prompt as input, and use the LLM outputs accordingly. The computing system can also provide helper nodes to help address data transformation and evaluation needs. The computing system can provide commonly-used Processing and Evaluation helpers. Furthermore, the computing system can also allow those chain authors who are familiar with basic programming to implement their own custom JavaScript (JS) nodes to maximize flexibility. Finally, to support users in prototyping AI-infused applications, the computing system can provide several Communication nodes for exchanging data with the external world. For example, the User Action Node can mimic the experience where end-users inspect and edit LLM outputs, whereas API nodes like Call YouTube API node can integrate professional services and LLM functionalities in prototyping.

Finally, the computing system can provide an example gallery of frequently composed (sub-)chains. The wide-ranging capabilities of LLMs means that users may need help developing a mental model of which capabilities are most likely to be useful. The computing system's gallery can showcase common LLM capabilities used in example chains, to help users make full use of LLM capabilities. It can also serve as a soft nudge towards a set of prompting patterns, such that users' prompts are more likely to be compatible with predefined processing nodes (e.g., Extraction with string to list parser in FIG. 3A). These examples can also be listed in the node library, so that users can decide whether they would want to start from scratch, or edit an existing chain.

Step view. This view in FIG. 2B allows users to explore each model step by interacting with inputs, outputs, and the underlying prompt structure. It is divided into an Instruction block and several Running blocks, to reflect possible parallel paths. The running blocks represent independent paths, each denoting a different LLM invocation, and the instruction block is an overarching driving force that applies to all running blocks. They are combined to form the ultimate prompt. For example, FIG. 2b2 is the final prompt for querying suggestions only for "too much text." It starts with the description in b1 and merges the texts in the running block thereafter, ignoring other unrelated problems.

Every running block visually resembles a text area with a number of editable text fields, but with colors and styling. It shows the prefix fields before colons (e.g., Short suggestions for improvement, c1) in the same color as the data rectangles, which helps users distinguish data layers. Thereafter, it switches between a text field (c2) and a list of text fields (b4) to reflect whether the data type of the operation is strings, or a list of strings. All these fields are editable, with the former affecting data layers, and the latter affecting intermediate data entries.

The step view also handles the per-step execution. Users can click the small "run" button to execute each running block individually. To improve natural language interaction transparency, this would also trigger a preview of the final prompt text (b2). The output is parsed and added to the corresponding output field (e.g., growing the list after "2) use bullet points") for users to further iterate on. Finished running blocks can be used "As example" (FIG. 2b3), i.e., moved into the instruction block and used as few-shot examples for other remaining running blocks, thereby gradually improving the quality of the instruction block. Alternatively, users can use the Play button on the top to run all the parallel blocks at once, to see (and compare) their results.

Node view. This view in FIG. 3B allows users to inspect, implement, and test individual nodes. When a node is selected, the panel can change in accordance with the node type. For LLM nodes, the computing system can show a lightweight panel for writing and editing prompts in free-form text. The computing system can directly parse the input and output names based on the prompts or functions. For example, if a user changes the bolded string in FIG. 5A to, the input on "Is about music" would also get renamed to "user input." This ensures that, even if users choose to create each node separately from the overall structure, these two layers of implementation always stay compatible with each other (e.g., there would not be an outdated handle of "reference" when the prompt is changed). Similarly, for JavaScript nodes like in FIG. 5B, we parse the node name, the input, and the output handles directly from the function.

Example Interactions and controls. Notably, there are three levels of control available with this example interface, from local customization of prompts to global modification of the model chain structure, each with clear cues on its impact. First, users can customize the prompt for a particular step, by changing its descriptions and saving certain finished running blocks as demonstrating, few shot examples using FIGS. 2b1 and b3. Since the customization only applies to the current step, all other views remain unchanged. Second, users can customize the transformed data, either by adding, deleting, or editing data entry content (e.g., "read outlines" to bold outlines in b4), or by renaming data layers (e.g., rephrasing "Alex's presentation problems" as "Criticisms of Alex" in a1). These changes impact both the immediate step-of-focus as well as other steps involving the same layers (e.g., Compose Points takes in both the "problems" and the "suggestion" layer), and thus they can be changed either in the colored rectangles in the chain view, or through text fields in FIG. 2B. Finally, users can more aggressively modify the model chain structure itself by adding, removing and rewiring operations or data layers in the visual view through intuitive visual programming. The change would then cause the entire model chain to re-render, with all the defaults (e.g., temperature, instructions) optionally refreshed.

Example Interactive Debugging Functionalities. With respect to the likelihood of cascading errors when authoring chained LLMs, the computing system can support chain debugging at various levels of granularity. First, to unit test each node, users can use the provided testing block (e.g., 502 from FIG. 5E) to test each node, with examples independent of the remaining chain. Second, to perform end-to-end assessment, users can run the entire chain and log the outputs per node, such that the ultimate chain output is easy to retrieve (e.g., 504 from FIG. 5E). Third, to help users map global errors to local causes, the computing system can support breakpoint debugging, and allow users to directly edit the output of a node before it is fed into the next node. By fixing intermediate node outputs, users can test a subset of downstream nodes independent of earlier errors.

Example Devices and Systems

FIG. 3A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel processing across multiple instances of inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a model creation/interaction service). Thus, one or more models 120 can be stored and implemented at the user computing device 102 and/or one or more models 140 can be stored and implemented at the server computing system 130. Additionally or alternatively, one or more machine-learned models 190 can be accessed as a service over the network 180. For example, the calls (e.g., requests for inference) can be made to the models 190 using one or more application programming interfaces (APIs).

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 3A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 3B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 3B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

FIG. 3C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 3C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 3C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to enable modular construction, control, and interpretability of a language model chain, the method comprising:
  receiving an initial language input;
  providing a user interface that visualizes and enables a user to edit a model chain that is configured to process the initial language input to generate a language output, wherein the model chain comprises a plurality of model instantiations of one or more machine-learned language models arranged in sequence such that, except for an initial model instantiation in the model chain, the respective model input of each model instantiation in the model chain comprises the respective model output from a sequentially previous model instantiation in the model chain;
  processing the initial language input with the model chain to generate the language output; and
  providing, for display within the user interface, data indicative of the respective model output of one or more of the plurality of model instantiations in the model chain.

2. The computer-implemented method of claim 1, wherein:
  providing, for display within the user interface, the data indicative of the respective model output of the one or more of the model instantiations comprises providing the user interface in a chain view mode that depicts a structure of the model chain.

3. The computer-implemented method of claim 2, wherein, in the chain view mode, the user interface is configured to receive user input for editing the structure of the model chain.

4. The computer-implemented method of claim 1, wherein:
  providing, for display within the user interface, the data indicative of the respective model output of the one or more of the model instantiations comprises providing the user interface in a step view mode in which the user interface is configured to receive a user input for editing, for each of the one or more of the model instantiations, a respective prompt that forms a portion of the respective model input of the one or more of the model instantiations.

5. The computer-implemented method of claim 1, wherein the method comprises:
  providing the user to add or remove model instantiations from the model chain and to edit connections between model instantiations in the model chain.

6. The computer-implemented method of claim 1, wherein the method comprises:
  providing a tool that enables the user to zoom into a visual block associated with one of the model instantiations to edit the respective model input associated with the model instantiation.

7. The computer-implemented method of claim 1, wherein the method comprises:

providing a tool that enables the user to zoom into a visual block associated with one of the model instantiations to edit the respective prompt associated with the model instantiation.

8. A computing system that chains one or more machine-learned language models to provide improved interpretability, the computing system comprising:
one or more processors; and
one or more non-transitory computer-readable media that collectively store instructions that, when executed by the one or more processors, cause the computing system to perform operations, the operations comprising:
receiving an initial language input;
processing the initial language input with a model chain to generate a language output,
wherein the model chain comprises a plurality of model instantiations of one or more machine-learned language models,
wherein each model instantiation is configured to receive and process a model input to generate a model output, wherein at least a portion of the model input comprises a model prompt descriptive of a task performed by the model instantiation on the model input to generate the model output, and
wherein the plurality of model instantiations in the model chain are arranged in a sequence such that, except for an initial model instantiation in the model chain, the respective model input of each model instantiation in the model chain comprises the respective model output from a sequentially previous model instantiation in the model chain; and
providing the language output as an output.

9. The computing system of claim 8, wherein the operations further comprise:
providing a user interface configured to provide a visualization of the model chain and to receive user input for modular construction of the model chain.

10. The computing system of claim 8, wherein the operations further comprise:
providing a user interface configured to receive user input for editing the respective prompt to each model instantiation in the model chain.

11. The computing system of claim 8, wherein the respective prompt to each model instantiation in the model chain is user-selectable from a number of pre-defined template prompts that correspond to primitive subtasks.

12. The computing system of claim 8, wherein the operations further comprise:
providing a user interface that visualizes and enables editing of the respective model output of at least one of the model instantiations in the model chain;
receiving, via the user interface, a user input that modifies the respective model output of the at least one of the model instantiations in the model chain; and
modifying the respective model output in accordance with the user input prior to inputting the respective model output into a sequentially subsequent model instantiation in the model chain.

13. The computing system of claim 12, wherein in response to the received user input, the operations further comprise:
altering the content of the respective model output of the at least one of the model instantiations in the model chain;
deleting content from the respective model output of the at least one of the model instantiations in the model chain; or
adding content to the respective model output of the at least one of the model instantiations in the model chain.

14. The computing system of claim 8, wherein:
the one or more machine-learned language models comprise a single machine-learned language model; and
the plurality of model instantiations comprise a plurality of model instantiations of the single machine-learned language model.

15. The computing system claim 8, wherein:
the one or more machine-learned language models comprise two or more different machine-learned language models; and
the plurality of model instantiations comprise a plurality of model instantiations of the two or more different machine-learned language models.

16. The computing system of claim 8, wherein:
the model chain is configured to perform a meta-task on the initial language input to generate the language output; and
each of the plurality of model instantiations of the one or more machine-learned language models in the model chain is configured to perform a respective one of a plurality of different component subtasks of the meta-task.

17. The computing system of claim 8, wherein the respective model input to at least one of the plurality of model instantiations in the model chain comprises:
the model output from the sequentially previous model instantiation in the model chain; and
the model output from one or more model instantiations in the model chain that each precede the sequentially previous model instantiation in the model chain.

18. The computing system of claim 8, wherein the language output comprises a natural language output.

19. The computing system of claim 8, wherein the language output comprises a programming language output.

20. The computing system of claim 8, wherein at least one of the machine-learned language models is stored separately from the computing system and accessed via an application programming interface.

* * * * *